United States Patent
Antonipieri et al.

(10) Patent No.: US 11,255,503 B2
(45) Date of Patent: Feb. 22, 2022

(54) LIGHTING DEVICE HAVING INDIVIDUALLY ILLUMINATED LIGHT GUIDES SEPARATED BY OPAQUE WALLS

(71) Applicant: MARELLI AUTOMOTIVE LIGHTING ITALY S.p.A., Turin (IT)

(72) Inventors: Michele Antonipieri, Turin (IT); Fabio Leone, Turin (IT)

(73) Assignee: MARELLI AUTOMOTIVE LIGHTING ITALY S.p.A., Turin (IT)

( * ) Notice: Subject to any disclaimer, the term of this patent is extended or adjusted under 35 U.S.C. 154(b) by 0 days.

(21) Appl. No.: 16/705,990

(22) Filed: Dec. 6, 2019

(65) Prior Publication Data

US 2020/0182428 A1   Jun. 11, 2020

(30) Foreign Application Priority Data

Dec. 7, 2018  (EP) ..................... 18425096

(51) Int. Cl.
*F21S 41/24*      (2018.01)
*F21S 43/249*     (2018.01)
(Continued)

(52) U.S. Cl.
CPC ............. *F21S 41/24* (2018.01); *F21S 41/148* (2018.01); *F21S 41/151* (2018.01);
(Continued)

(58) Field of Classification Search
CPC ........ F21S 41/24; F21S 41/148; F21S 41/151; F21S 41/40; F21S 41/50; F21S 41/55;
(Continued)

(56) References Cited

U.S. PATENT DOCUMENTS 5,327,328 A * 7/1994 Simms ................. G02B 6/0001
362/23.07
5,390,436 A * 2/1995 Ashall .................. G02B 6/0043
40/546
(Continued)

FOREIGN PATENT DOCUMENTS

EP   2292972 A1 *  3/2011  .............. F21S 43/14
EP   2292972 A1    3/2011
(Continued)

OTHER PUBLICATIONS

European Search Report for European Patent Application No. 18425096 dated Apr. 17, 2019.

*Primary Examiner* — Ismael Negron
(74) *Attorney, Agent, or Firm* — Howard & Howard Attorneys PLLC

(57) ABSTRACT

A lighting device including at least two LED light sources configured for individual activation; at least two light guides arranged adjacent to one another, each including an edge surface facing a respective one of the LED light sources, a back surface extending from the edge surface provided with a plurality of diffuser extractor elements, and a front surface extending from the edge surface and opposite the back surface; and opaque barrier walls provided between the at least two light guides and extending from the rear wall to the front wall, to mechanically and optically separate the light guides. The light guides are configured to receive light from the LED light sources, with the diffuser extractor elements arranged shaped redirect received light traveling within the light guide to be projected through the front surface.

26 Claims, 8 Drawing Sheets

(51) Int. Cl.

| | |
|---|---|
| *F21S 43/14* | (2018.01) |
| *F21S 41/148* | (2018.01) |
| *F21S 43/239* | (2018.01) |
| *F21S 43/245* | (2018.01) |
| *F21S 41/151* | (2018.01) |
| *F21S 41/20* | (2018.01) |
| *F21S 43/20* | (2018.01) |

(52) U.S. Cl.
CPC ............. *F21S 41/285* (2018.01); *F21S 43/14* (2018.01); *F21S 43/239* (2018.01); *F21S 43/245* (2018.01); *F21S 43/249* (2018.01); *F21S 43/26* (2018.01)

(58) Field of Classification Search
CPC ........ F21S 41/663; F21S 43/249; F21S 43/14; F21S 43/239; F21S 43/245; F21S 43/20; F21S 43/50; F21S 43/51; F21S 41/141; F21S 43/235; G02B 6/0078; G02B 6/0051; G02B 6/0011; G02B 6/0033; G02B 6/0036; G02B 6/43; B60Q 3/14; B60Q 3/64; F21V 2200/20; F21K 9/61
USPC ........................................................ 362/511
See application file for complete search history.

(56) References Cited

U.S. PATENT DOCUMENTS

| | | | | |
|---|---|---|---|---|
| 6,463,204 | B1* | 10/2002 | Ati | G02B 6/0008 |
| | | | | 385/146 |
| 7,505,024 | B2* | 3/2009 | Yoo | G02B 6/0055 |
| | | | | 345/102 |
| 7,891,855 | B2* | 2/2011 | Yang | G02B 6/4277 |
| | | | | 362/616 |
| 8,419,986 | B2* | 4/2013 | Gourlay | G02B 6/0068 |
| | | | | 264/1.24 |
| 8,491,174 | B2* | 7/2013 | Derichs | G02B 6/0011 |
| | | | | 362/612 |
| 9,447,940 | B2* | 9/2016 | Chen | F21S 41/148 |
| 9,500,793 | B2* | 11/2016 | Mickmann | H04L 12/40013 |
| 10,120,121 | B2* | 11/2018 | Huang | G02B 6/0008 |
| 10,620,367 | B2* | 4/2020 | Fitzpatrick | G02B 6/0001 |
| 2014/0147613 | A1* | 5/2014 | Omote | B29C 45/0046 |
| | | | | 428/58 |
| 2016/0069525 | A1* | 3/2016 | Chen | F21S 41/148 |
| | | | | 362/612 |
| 2018/0292061 | A1 | 10/2018 | Taudt et al. | |

FOREIGN PATENT DOCUMENTS

| | | |
|---|---|---|
| EP | 3181401 A1 | 6/2017 |
| JP | 2009206064 A | 9/2009 |
| WO | 2017054020 A1 | 4/2017 |

* cited by examiner

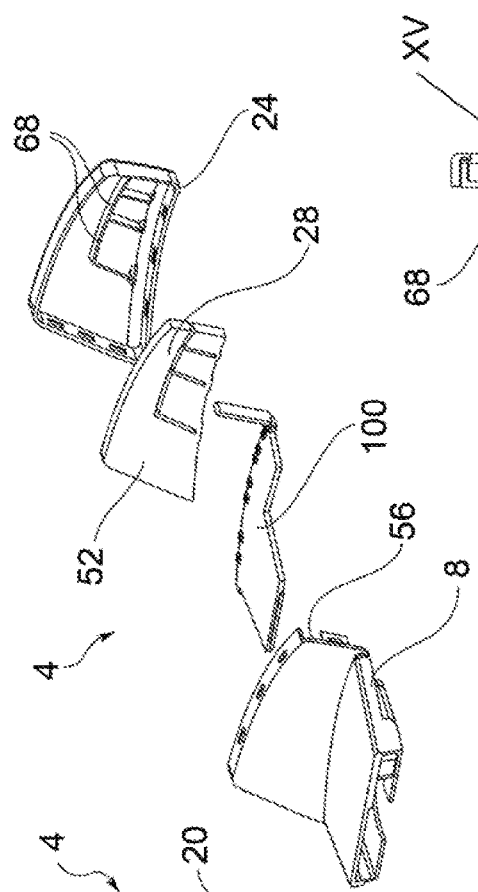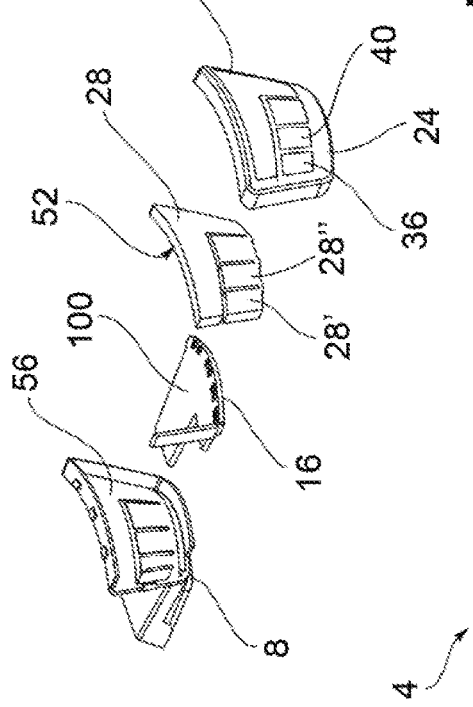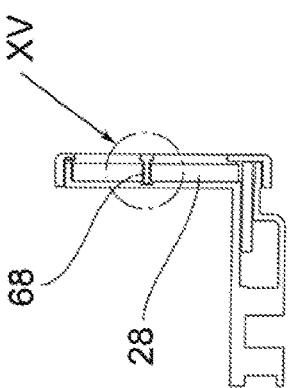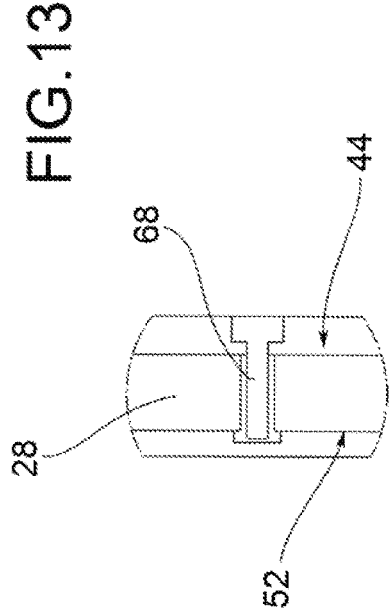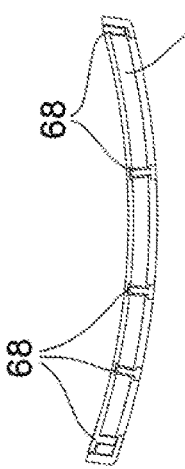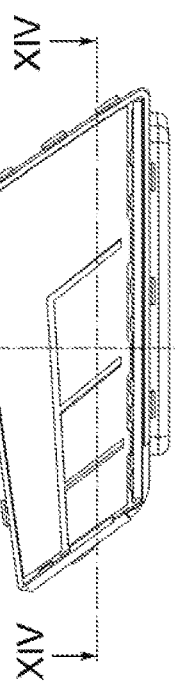

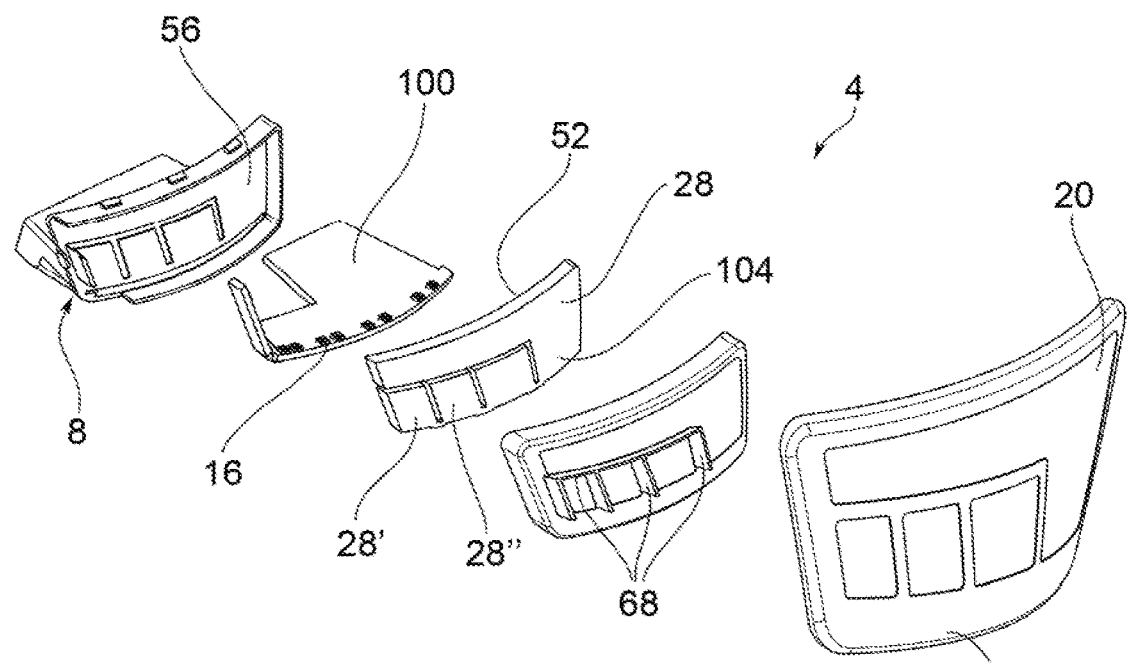
FIG.16
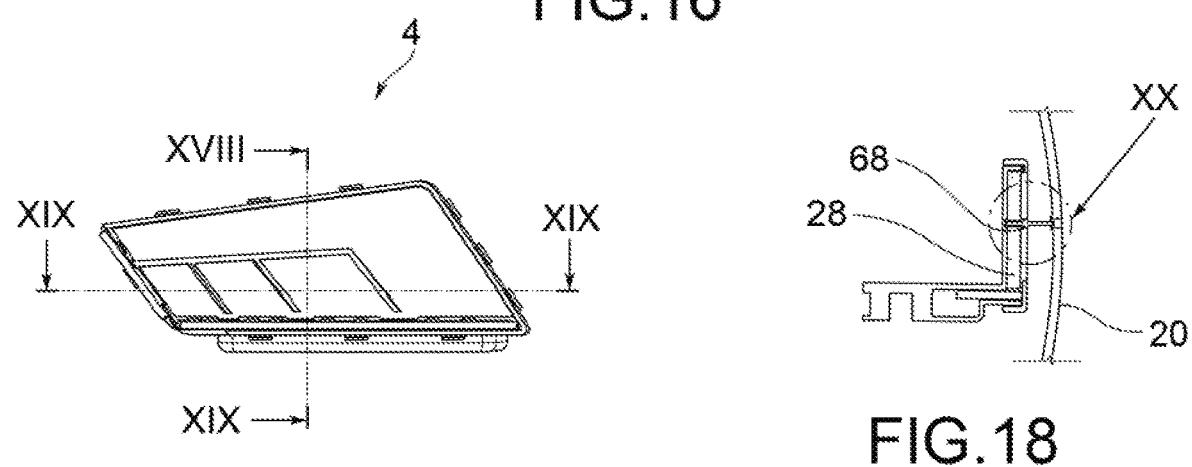
FIG.17
FIG.18
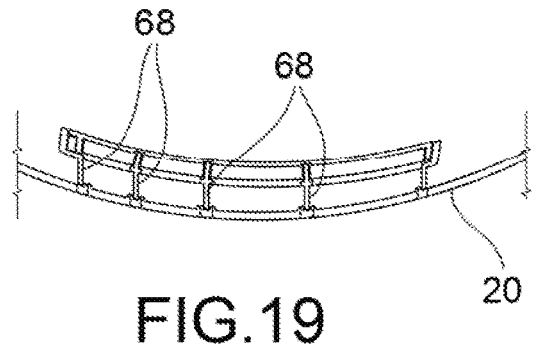
FIG.19
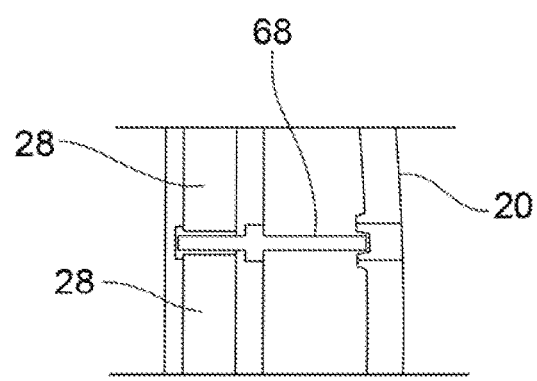
FIG.20

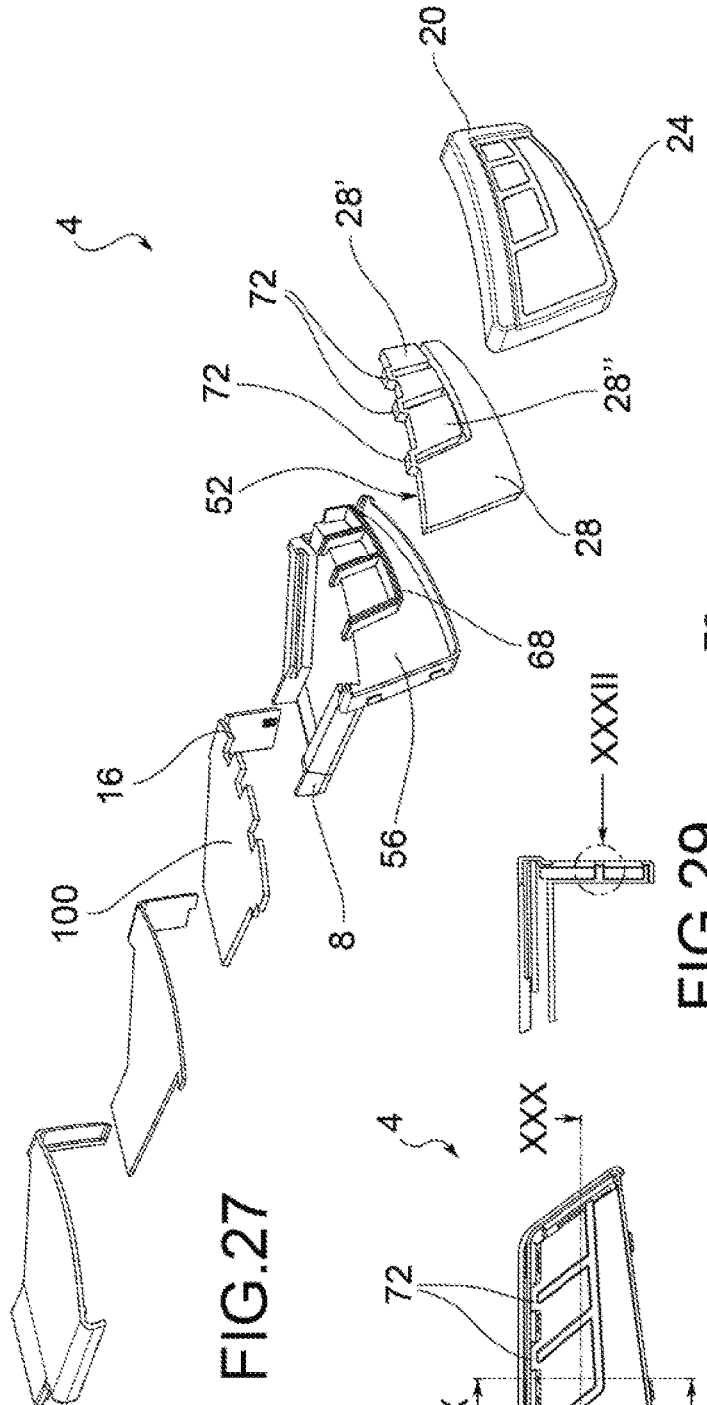
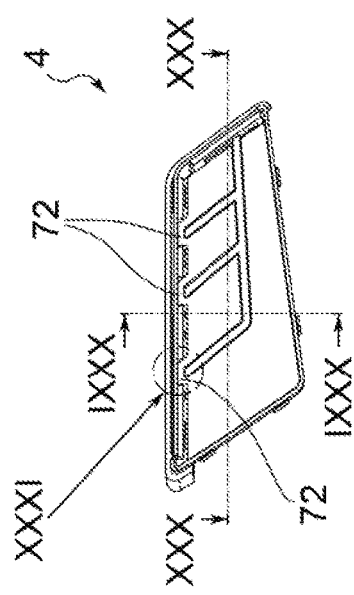
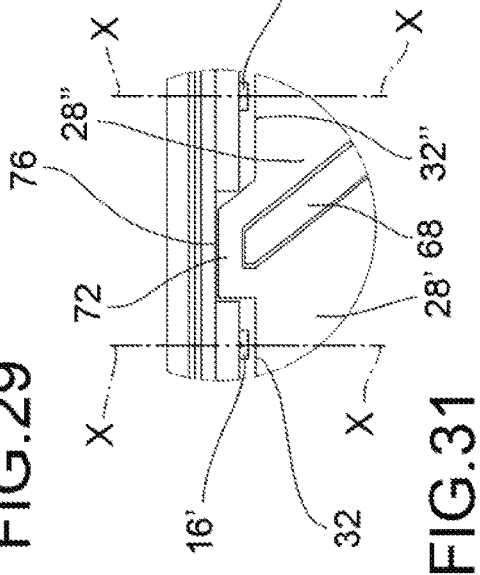
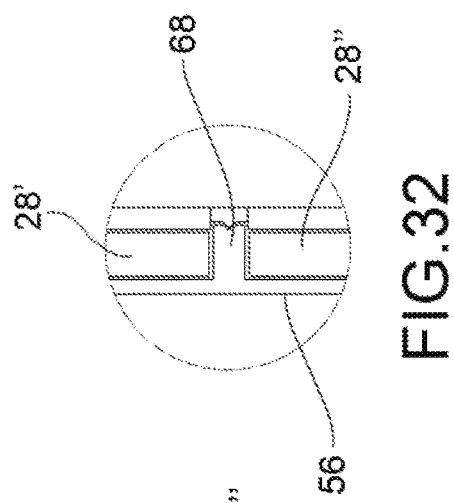
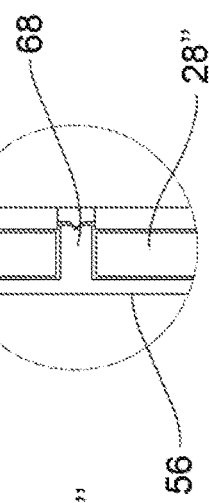

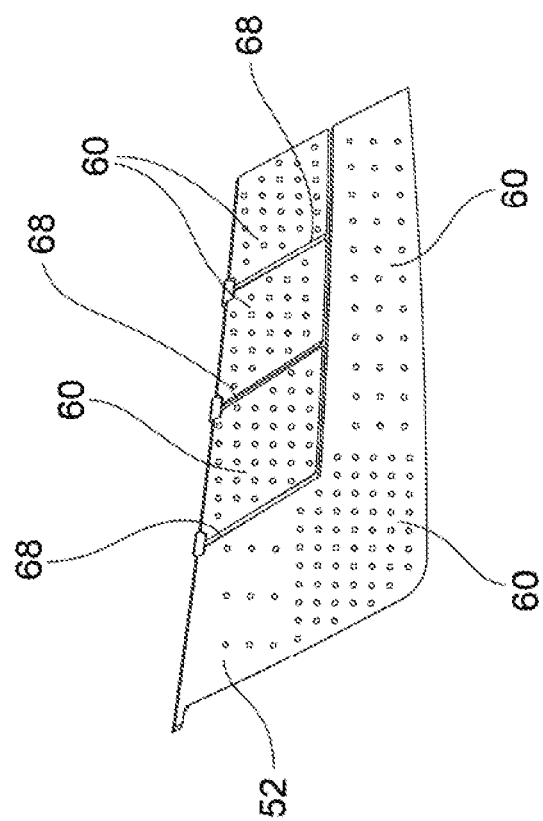
FIG.37
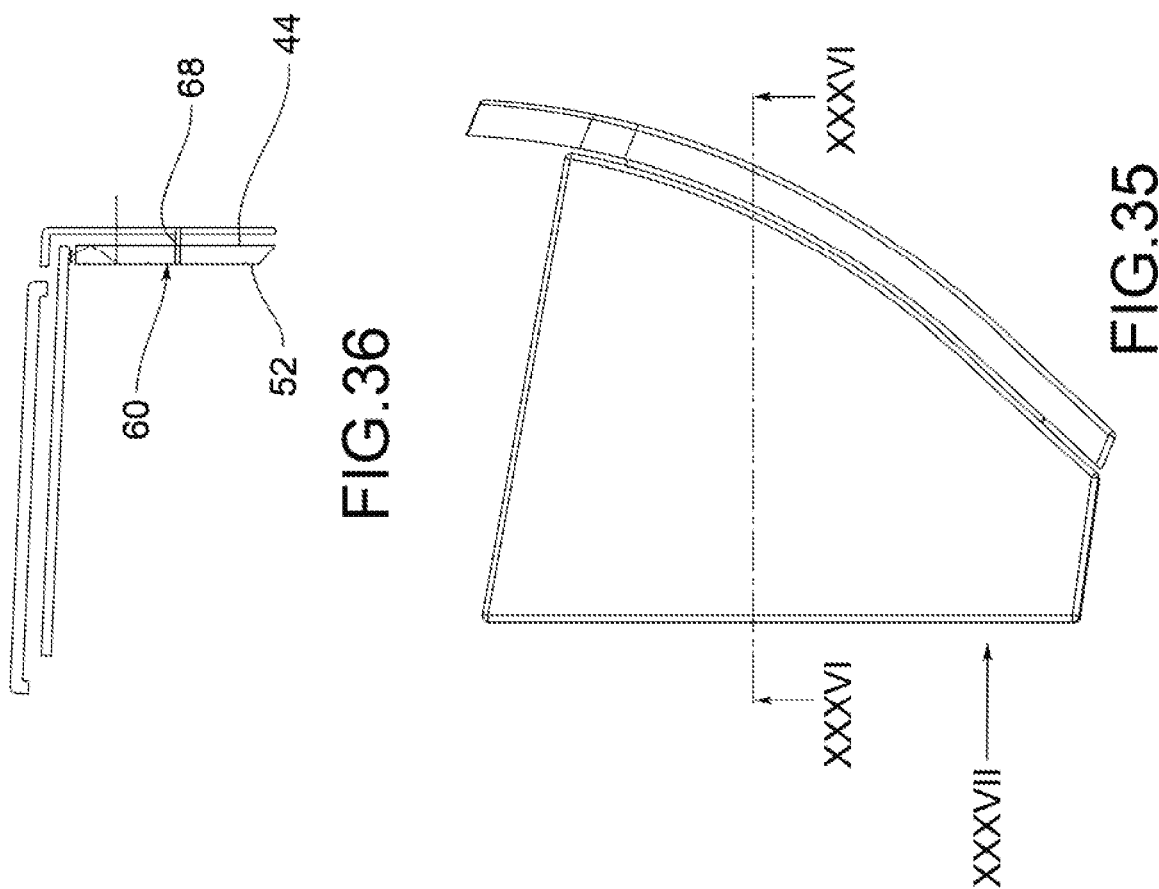
FIG.36
FIG.35

LIGHTING DEVICE HAVING INDIVIDUALLY ILLUMINATED LIGHT GUIDES SEPARATED BY OPAQUE WALLS

CROSS-REFERENCE TO RELATED APPLICATIONS

The present application claims priority to and all the benefits of European Patent Application No. 18425096, filed on Dec. 7, 2018, which is hereby expressly incorporated herein by reference in its entirety.

BACKGROUND OF THE INVENTION

1. Field of the Invention

The present invention relates to a vehicle lighting and/or signalling device.

2. Description of the Related Art

The term vehicle lighting and/or signalling device is used herein in a very broad sense so as to comprise a vehicle light, both rear and front, the latter also called a headlamp, or headlight.

This therefore comprises a sidelight, an indicator light, a brake light, a rear fog light, a reverse light, a dipped beam headlight, a main beam headlight and the like.

In addition, the term is also intended to a courtesy light, dashboard or part of it; therefore, the vehicle lighting and/or signalling device may be placed both internally and externally to the vehicle.

As is known, said vehicle lighting and/or signalling devices can be used both to illuminate and to send visual signals.

For these purposes, said devices comprise a plurality of lighting portions or faces having different colours and different levels of luminosity, (also according to the regulations to be complied with and) the like.

The need is increasingly felt to make vehicle lighting and/or signalling devices that ensure a high uniformity of the lighting portions in order to satisfy both aesthetic and functional requirements.

In this regard, solutions with O-LEDs exist in the art that guarantee a high uniformity of the lighting portions/faces; however, these solutions are very expensive and still have limitations in terms of realization of the lighting portions/faces adjacent to each other, which can in any case be activated independently.

SUMMARY OF THE INVENTION

Such latter limitation is not negligible given that the need is increasingly felt in the art to use the vehicle light not only as an instrument to satisfy type-approval requirements in order to obtain light beams that satisfy particular photometric requirements but also as a design instrument specific to the vehicle on which the light is used.

Therefore, the light pattern emitted by the light does not only have the function of fulfilling the signalling and/or lighting function but also that of creating a precise desired light effect.

In addition, the lighting and/or signalling device may also be used in order to send light signals such as texts, graphic symbols, as well as to produce light animations made by precise activation sequences of lighting portions.

Such need may be achieved by a lighting device comprising a segmented light guide, the segments of which may be switched on by command. Between two adjacent segments there is an opaque separation element, which prevents the light conveyed in one segment from passing into the adjacent segment. In order to have clear signals that are pleasant to look at, it is important to ensure that no light leaks, even minimal, are created between the various adjacent segments. However, some light beams may escape from the individual light guide elements and may be reflected by additional elements so as to enter, albeit in a minimal manner, adjacent segments. This problem of leakage occurs in particular at edges or perimeter boundary portions between adjacent segments and, moreover, the leakage may occur, by reflection, even between light guide segments not directly neighbouring or adjacent to each other.

The need is therefore felt in the art to provide a lighting and/or automotive signalling device that makes it possible to obtain the aforementioned technical effects, which guarantees a high homogeneity of lighting (comparable to that obtainable with the O-LEDs), but without presenting the drawbacks of the O-LED technology and that allow differentiated, exclusive and confined activation of specific portions of light, without light beam leakage phenomena.

In fact, any light leakage between adjacent lighting portions causes a worsening of the desired visual effect and a possible unclear communication of the information to be provided by activating single and clearly delineated portions.

In other words, the need is felt to provide an automotive headlight that has the same performance as O-led technology in terms of uniformity of lighting but significantly lower costs, as well as a light that has differentiated sectors that can be switched on separately without the risk of light leakage from one sector to another, i.e. without the risk that light rays can illuminate even partially a sector that does not need to be switched on.

Such need is satisfied by a vehicle lighting and/or signalling device, in particular for the automotive sector, comprising at least two LED light sources, powered and activated separately, each facing a respective light input wall of a corresponding light guide. The light guides are suitable to transmit and emit the light of said LED light sources through at least two distinct lighting faces at a front wall of the lighting device, permeable to light. The light guides include diffuser extractor elements arranged on a rear wall of the light guide, opposite the front wall, and/or arranged on said front wall and shaped so as to extract the light outside the lighting and/or signalling device. The light guides are juxtaposed and adjacent to each other at at least one respective inner wall. The light guides are mechanically and optically separated by barrier elements which prevent the passage of light between the light guides at the at least one inner wall. The barrier elements are separator septa opaque to the light extending from the rear wall to at least the front wall, crossing it completely.

Other objects, features and advantages of the present invention will be readily appreciated as the same becomes better understood after reading the subsequent description taken in connection with the accompanying drawings.

BRIEF DESCRIPTION OF THE DRAWINGS

Further characteristics and advantages of the present invention will be more clearly comprehensible from the description given below of its preferred and non-limiting embodiments, wherein:

FIG. 2 shows a front view, in an assembled configuration, of the lighting and/or signalling device in FIG. 1;

FIG. 3 shows cross-section views of the lighting and/or signalling device in FIG. 1, along the cross-section plane III-III shown in FIG. 2;

FIG. 4 shows cross-section views of the lighting and/or signalling device in FIG. 1, along the cross-section plane IV-IV shown in FIG. 2;

FIG. 5 shows the enlarged detail V of FIG. 3;

FIG. 11 shows two perspective view, in separate parts, from different angles, of a lighting and/or signalling device according to a further embodiment of the present invention;

FIG. 12 shows a front view, in an assembled configuration, of the lighting and/or signalling device in FIG. 11;

FIG. 13 shows a cross-section view of the lighting and/or signalling device in FIG. 1, along the cross-section plane XIII-XIII shown in FIG. 12;

FIG. 14 shows a cross-section view of the lighting and/or signalling device in FIG. 1, along the cross-section plane XIV-XIV shown in FIG. 12;

FIG. 15 shows the enlarged detail XV of FIG. 13;

FIG. 16 shows a perspective view, in separate parts, of a lighting and/or signalling device according to a further embodiment of the present invention;

FIG. 17 shows a front view, in an assembled configuration, of the lighting and/or signalling device in FIG. 16;

FIG. 18 shows a cross-section view of the lighting and/or signalling device in FIG. 16, along the cross-section plane XVIII-XVIII shown in FIG. 17;

FIG. 19 shows a cross-section view of the lighting and/or signalling device in FIG. 16, along the cross-section plane XIX-XIX shown in FIG. 17;

FIG. 20 shows the enlarged detail XX of FIG. 18;

FIG. 27 shows a perspective view, in separate parts, of a lighting and/or signalling device according to a further embodiment of the present invention;

FIG. 28 shows a front view, in an assembled configuration, of the lighting and/or signalling device in FIG. 27;

FIG. 29 shows a cross-section view of the lighting and/or signalling device in FIG. 27, along the cross-section plane IXXX-IXXX shown in FIG. 28;

FIG. 30 shows a cross-section view of the lighting and/or signalling device in FIG. 27, along the cross-section plane XXX-XXX shown in FIG. 28;

FIG. 31 shows the enlarged detail XXXI of FIG. 28;

FIG. 32 shows the enlarged detail XXXII of FIG. 29;

FIG. 35 shows a plan view of a vehicle light according to one embodiment of the present invention;

FIG. 36 is a cross-section view of the vehicle light in FIG. 35, along the cross-section plane XXXVI-XXXVI in FIG. 35;

FIG. 37 represents a side view of the vehicle light of FIG. 35, from the side of the arrow XXXVII of FIG. 35.

The elements or parts of elements common to the embodiments described below will be indicated using the same reference numerals.

DETAILED DESCRIPTION OF THE INVENTION

Figure 1:
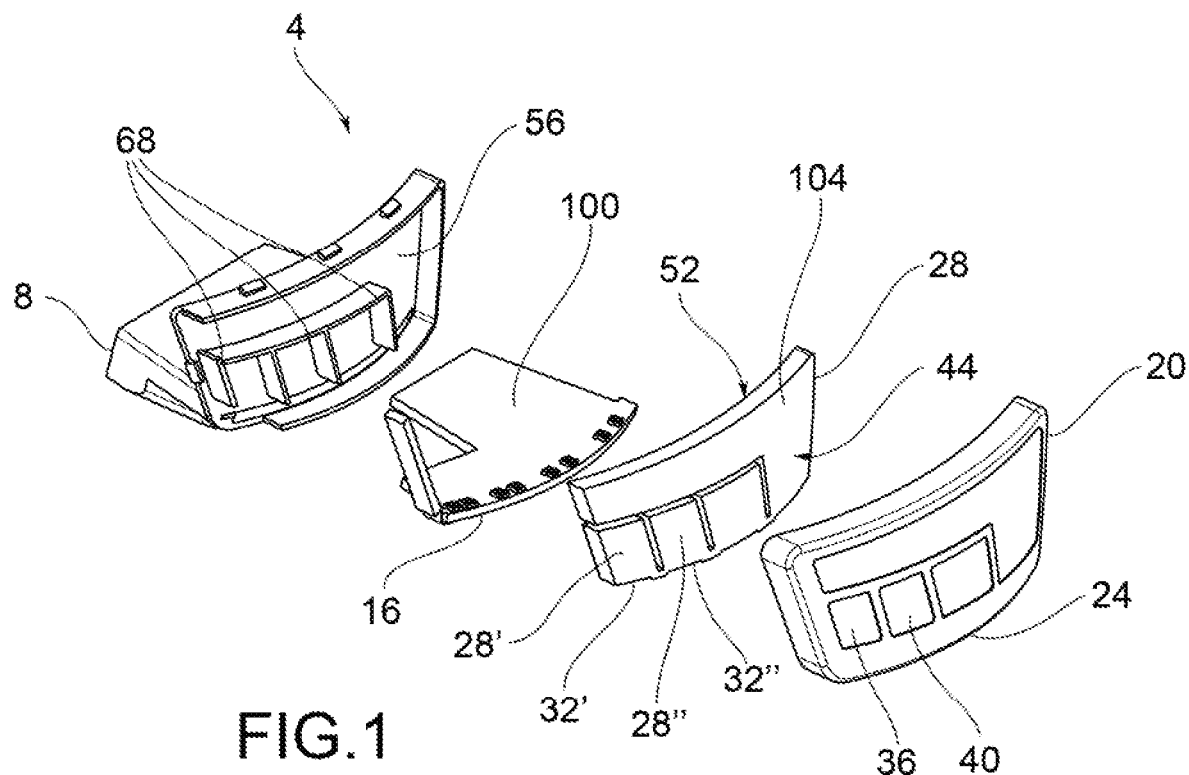
FIG. 1 shows a perspective view, in separate parts, of a lighting and/or signalling device according to one embodiment of the present invention.
Figure 6:
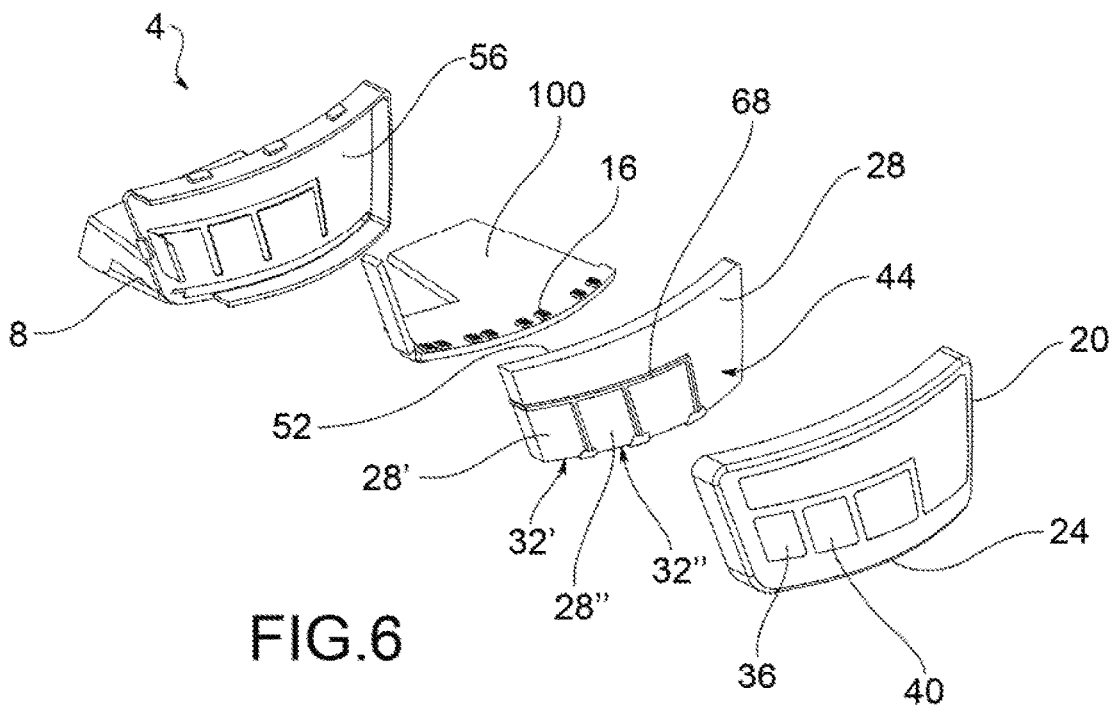
FIG. 6 shows a perspective view, in separate parts, of a lighting and/or signalling device according to a further embodiment of the present invention.
Figure 7:
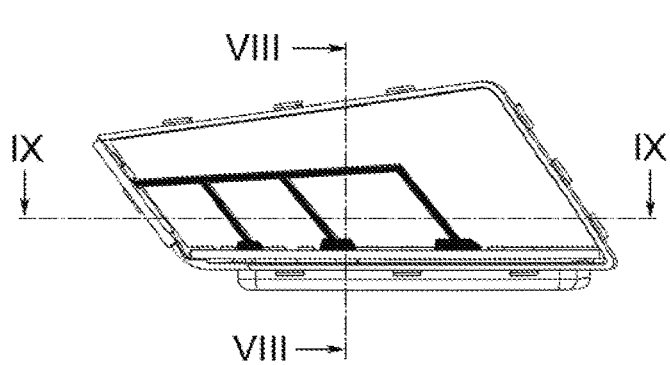
FIG. 7 shows a front view, in an assembled configuration, of the lighting and/or signalling device in FIG. 6.
Figure 8:
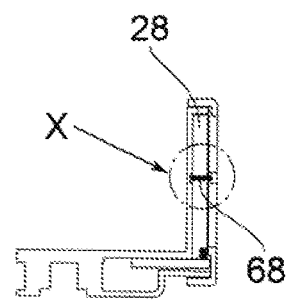
FIG. 8 shows a cross-section view of the lighting and/or signalling device in FIG. 1, along the cross-section plane shown in FIG. 7.
Figure 9:
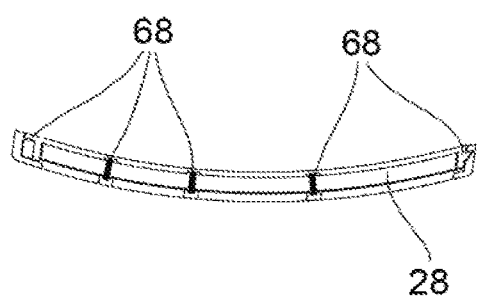
FIG. 9 shows a cross-section view of the lighting and/or signalling device in FIG. 1, along the cross-section plane IX-IX shown in FIG. 7.
Figure 10:
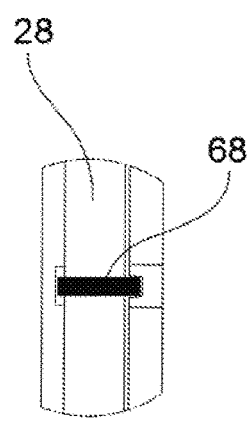
FIG. 10 shows the enlarged detail X of FIG. 8.
Figure 21:
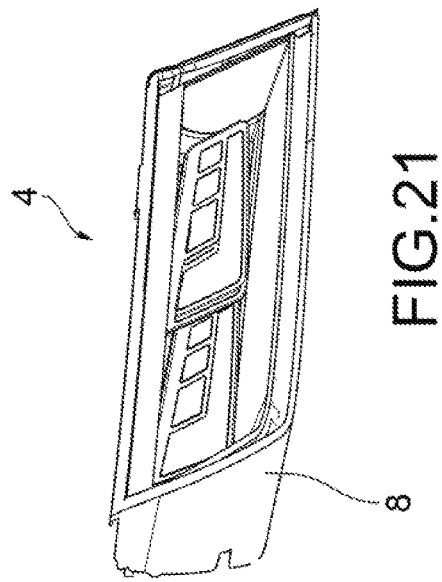
FIG. 21 shows a perspective view, in separate parts, of a lighting and/or signalling device according to a further embodiment of the present invention.
Figures 26A, 26B:
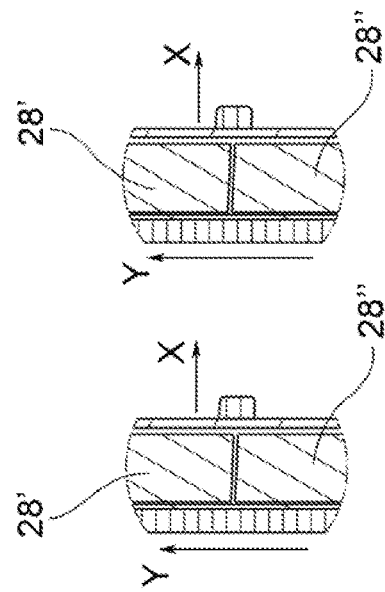
FIGS. 26A-26B show embodiment variants of the enlarged detail XXVI shown in FIG. 25.
Figure 24:
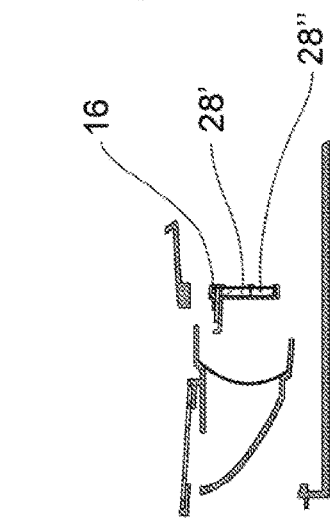
FIG. 24 shows a cross-section view of the lighting and/or signalling device in FIG. 21, along the cross-section plane XXIV-XXIV shown in FIG. 22.
Figure 25:
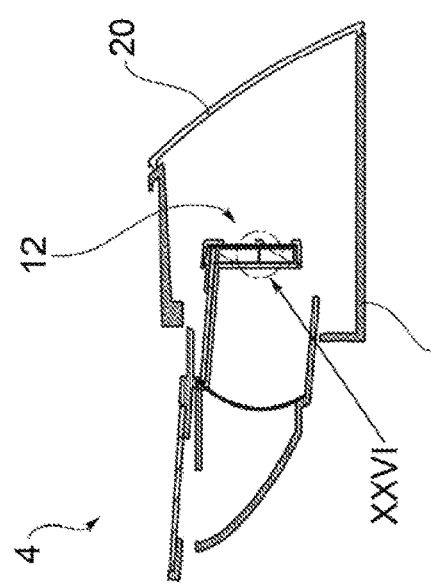
FIG. 25 shows a cross-section view of the lighting and/or signalling device in FIG. 21, along the cross-section plane XXV-XXV shown in FIG. 22.
Figure 22:
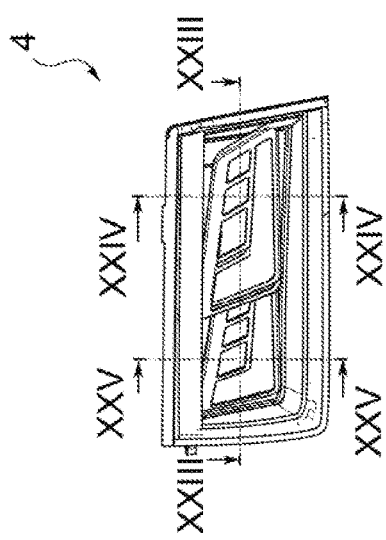
FIG. 22 shows a front view, in an assembled configuration, of the lighting and/or signalling device in FIG. 21.
Figure 23:
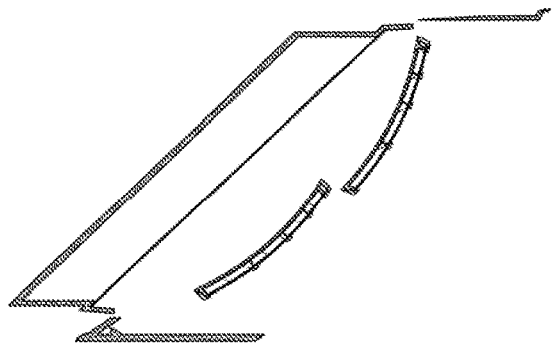
FIG. 23 shows a cross-section view of the lighting and/or signalling device in FIG. 21, along the cross-section plane XXIII-XXIII shown in FIG. 22.
Figure 33:
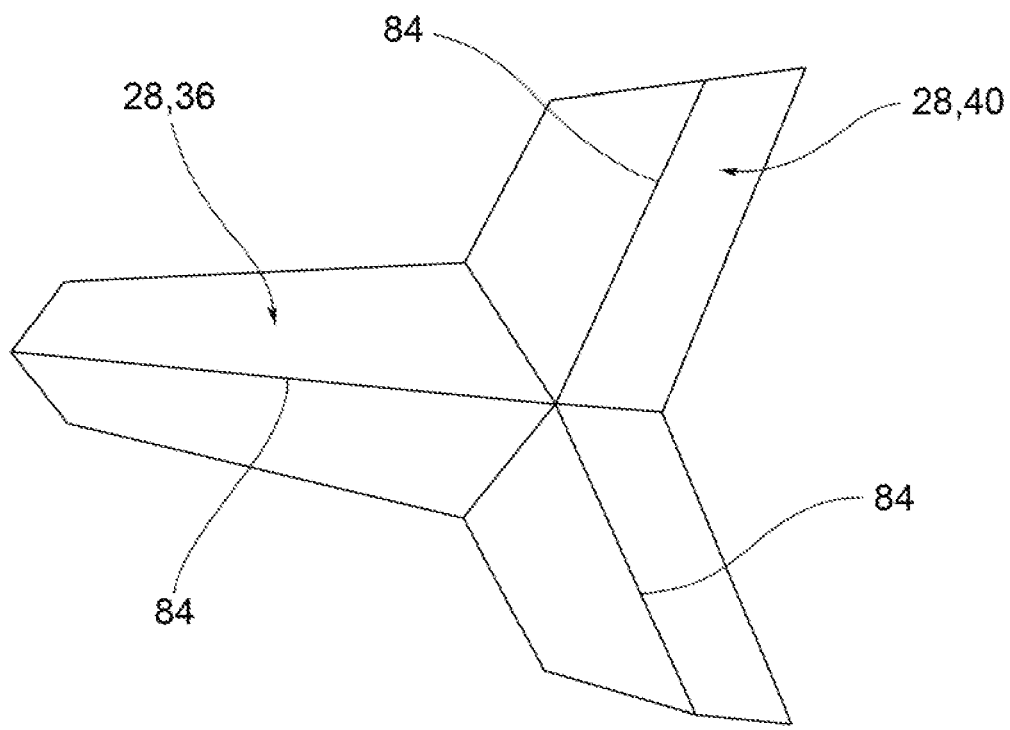
FIG. 33 shows a front view, in separate parts, of a lighting and/or signalling device according to a further possible embodiment variant of the present invention.
Figure 34:
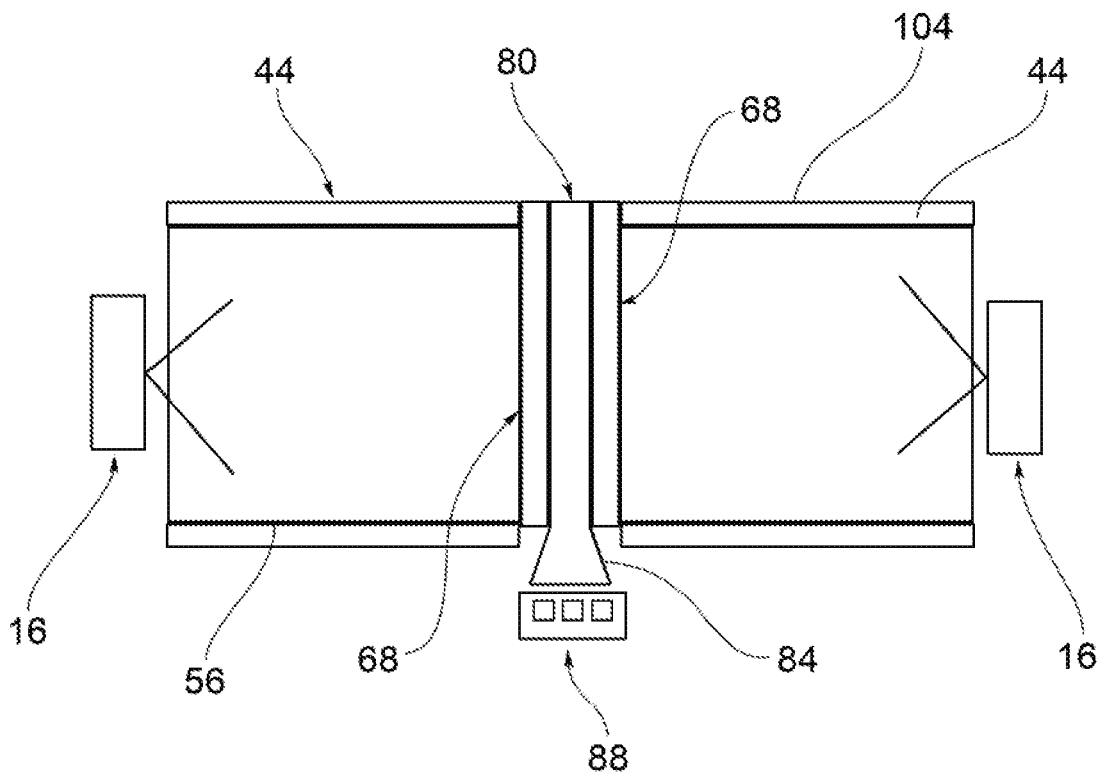
FIG. 34 shows a cross-section view, along the plane XXXIV-XXXIV, of the device in FIG. 33.

With reference to the aforementioned figures, reference numeral 4 globally denotes a vehicle light or signaling device to which the following discussion will refer without by so doing detracting from its general application and where like numerals are used to designate like structure throughout the drawings.

As mentioned above, the term lighting and/or signalling device is understood to mean indifferently a rear vehicle light or a front vehicle light, the latter also known as a headlight or headlamp, comprising an outside light of the vehicle having a lighting and/or signalling function, as for example a position light, which may be a front, back, side position light, a direction indicator light, a brake light, a rear fog light, a reversing light, a low beam headlight, a high beam headlight, and the like.

In addition, the term lighting and/or signalling device also means an interior courtesy light, a dashboard or part of it, a display and so forth.

Consequently, as better described below, in its signalling function the device may comprise the possibility of sending luminous signals, logos, but also written and luminous messages of any kind.

The lighting and/or signalling device 4 comprises a container body or housing 8, usually of polymeric material, which generally allows the attachment of the lighting and/or signalling 4 device to the relative vehicle.

For the purposes of the present invention, the container body or housing 8 may be any shape, size and assume any position: for example, the container body 8 need not be directly associated to the body or other external fixtures of the associable vehicle.

As explained in the written description with reference to the accompanying drawings, those having ordinary skill in the art will appreciate that the container body 8 may also be associated inside the vehicle, e.g. on the instrument panel, dashboard, parcel shelf and so forth.

The container body 8 delimits a containment seat 12 that houses a plurality of components of said lighting and/or signalling device and in particular LED light sources 16.

The container body 8 may for example be associated, at least partially so as to close a lenticular body 20 so as to close said containment seat 12 housing at least one LED light source 16.

For the purposes of the present invention the lenticular body 20 may be external to the vehicle lighting and or signalling device 4, so as to define at least one outer wall of the vehicle lighting and or signalling device directly subject to the atmosphere.

The lenticular body 20 closes the containment seat 12 and is suitable to be crossed by the beam of light produced by the LED light source 16 which is transmitted to the outside of the containment seat 12.

To such purpose, the lenticular body 20 is made of at least partially transparent or semi-transparent or translucent material, and may also comprise one or more opaque portions, so as to allow in any case the at least partial crossing of the light beam produced by the light source.

According to possible embodiments, the material of the lenticular body 20 is a resin such as PMMA, PC and the like.

A mask 24 may also be applied to the lenticular body 20 to appropriately delimit light emitting portions of the lighting and/or signalling device 4, as further described below.

The lighting and/or signalling device 4 comprises at least two LED light sources 16', 16", powered and activated separately, each facing a respective light guide 28', 28".

The light guides 28 may have various shapes and conformations within the container body 8.

The shapes and dimensions of the light guides 28', 28" may be various; the number of light guides may be greater than two and the light guides 28', 28" may be arranged to form lighting faces 36,40 having any shape and extension.

In this way it is possible to switch on different lighting portions, even in a large number (well beyond the two units) in order to create possible optical effects or also in order to create, with said lighting portions, the writing, logos, messages that may have additional functions compared to the established lighting function.

In this way the lighting device 4 becomes a signalling device. To this end, it is possible to form and arrange the light guides 28 so as to have lighting portions arranged according to various geometric patterns: in this way it is possible to compose alphanumeric codes that therefore comprise both numbers and letters of the alphabet.

The LED light sources 16', 16" each face a respective light input wall 32', 32" of the corresponding light guide 28', 28" through which the light beam produced is channeled inside the light guide 28', 28" and transmitted by the latter.

It is therefore evident that the LED light sources 16 can be placed at a margin of the respective light guides 28.

The LED light sources 16', 16" are therefore arranged along a perimeter formed by the unification of the light guides 28', 28" and are powered/housed by an electronic board or several electronic boards 100 which follow said perimeter. The electronic boards 100 may be rigid or flexible in order to better adapt to said perimeter.

In particular, said light guides 28', 28" emit the light of said LED light sources 16', 16" through at least two respective and distinct lighting faces 36,40 at a front wall 44 of the lighting and/or signalling device 4, the front wall 44 being permeable to light.

The light guides 28', 28" and the respective LED light sources 16', 16" are preferably configured to satisfy a total internal reflection condition of the light beam passing through the light guides 28', 28".

In this case, the couplings between the light guides 28', 28" and the respective LED light sources 16', 16" are configured so that the light beam propagated inside said light guides 28', 28" satisfies a total internal reflection condition between the opposite faces of the light guides 28', 28", with respect to a prevailing propagation direction X-X and at the same time is diffused towards the margins of the aforementioned light guides according to a diffusion direction Y perpendicular to said prevailing propagation direction X.

As a result, the light input wall 32', 32" of the light guides 28', 28", directly facing the corresponding LED light sources 16', 16", is in turn configured to transmit the light inside the light guide 28', 28" in the total internal reflection condition.

The light input walls 32', 32" of the light guides 28', 28" may comprise optics 60, e.g., cylindrical section grooves or prominences, for opening the light beam along said Y-Y diffusion direction perpendicular to the prevailing X-X propagation direction.

In one embodiment, the optics 60 have a pitch between 50 μm and 2 mm.

The light guides 28', 28" are in turn provided with diffuser extractor elements 48 arranged on a rear wall 52 opposite the front wall 44, and/or arranged on the front wall 44, to extract the beam of light propagated inside said light guides 28', 28".

In other words, the light beam produced by each light source 16', 16" penetrates inside the light guide 28', 28" through the light input wall 32', 32" and is reflected inside the light guide 28', 28", until it meets the diffuser extractor elements 48 that reflect it outside the light guide 28', 28".

More precisely, the light beam diffused by the diffuser extractor elements 48, located on the rear wall 52, can be sent to the front wall 44 from which it exits.

However, the light beam diffused by the diffuser extractor elements 48 may also be sent in the opposite direction, i.e., opposite the front wall 44.

Each light guide 28', 28" is therefore provided with at least one reflector element 56, associated with each light guide 28', 28" on the side of its rear wall 52, so as to be directly facing the respective diffuser extractor elements 48, to reintroduce the light that has come out of the light guide 28', 28" and reflect it towards the front wall 44.

The container body 8 may in turn be provided preferably with an inner side surface 96 provided with light reflecting elements 56.

For example, the inner side surface 96 is reflective by including a white film co-moulded along the inner side surface 96.

As a result, the light reflecting elements 56 are positioned rear of the diffuser extractor elements 48.

According to a possible embodiment, the diffuser extractor elements 48 are micro-optics/micro structures, such as for example point-shaped micro-depressions, which diffuse light to the front wall 44 or towards the light reflecting elements 56.

In one embodiment, the diffuser extractor elements 48 are arranged according to a non-homogeneous scheme having a density that increases as the distance from the light source 16 increases along the extension of the light guide 28', 28".

According to a possible embodiment, the light reflecting element 56 is a white film reflecting the light coming from the rear wall 52 of the light guides 28', 28".

The light reflecting element 56 may also comprise a reflecting mirror.

Advantageously, the light guides 28', 28" are juxtaposed and adjacent to each other at at least one respective inner wall 64.

In addition, the light guides 28', 28" are mechanically and optically separated by barrier elements 68 which prevent the passage of light between the light guides 28', 28" at said at least one inner wall 64.

In one embodiment, the barrier elements 68 delimit the entire perimeter of the light guides 28', 28" so as to optically isolate and delimit the front wall 44 corresponding to each light guide 28', 28".

Advantageously, said barrier elements 68 are separator septa opaque to the light extending from the reflector element 56 to at least said front wall 44, crossing it completely.

In one embodiment, the barrier elements 68 completely cross any portion transparent to light rays arranged beyond the reflector element 56 towards the front wall 44, comprising the latter. In other words, the barrier elements 68 extend to encompass any surface capable of reflecting light rays coming out from the respective light guide segments.

According to a possible embodiment, said front wall 44 belongs to the light guide 28.

According to a further possible embodiment, the front wall 44 belongs to the lenticular body 20 associated in front of said light guides 28', 28", on the opposite side with respect to the reflector element 56. The lenticular body 20 is crossed by the barrier elements 68 that extend from the light guides 28', 28", so that the rays coming out from one of the light guides 28', 28" are not reflected by the front wall 44 towards the other light guide 28', 28".

According to a possible embodiment, the barrier elements 68 are associated with the reflector element 56, cross the light guide 28 and extend as far as the front wall 44. The front wall 44 may moreover be a separate element from the lenticular body 20 and from the light guide 28 and be placed between these two elements.

According to a possible embodiment, the barrier elements 68 are co-moulded or embedded in the light guide 28 and extend at least partially (or even completely) inside the reflector element 56 and at least partially (or even completely) inside the front wall 44.

An embodiment is also possible in which the barrier elements 68 are co-moulded with the front wall 44 and extend as far as the reflector element 56. The barrier element 68 may also comprise a film opaque to light.

According to a further embodiment, a lenticular body 20 is provided, associated to cover the light guide 28, wherein said lenticular body 20 is arranged at a distance from the light guide 28 such as not to be able to reflect back the light beams towards said light guide.

According to a possible embodiment, at least two light guides 28', 28" are provided, joined together by an appendage 72, on the side of the respective light input walls 32', 32", the appendage 72 being arranged in a position substantially rearward with respect to the LED light sources 16', 16", parallel to a prevailing propagation direction X-X of the light beams emitted by the LED light sources 16', 16". In this way the segmented light guide consists of a single piece to facilitate assembly.

For example, at least two appendages 72', 72" are provided connecting three light guides 28', 28", 28''' contiguous to each other, the appendages 72', 72" identifying a housing seat 76 of at least one light source 16.

According to a possible embodiment, at least one of the separator septa or barrier elements 68 is provided with a through inner seat 80 inside which a perimeter light guide 84 is housed to which a perimeter light source 88 is associated and configured to selectively illuminate the inner seat 80.

The inner seat 80 is optically shielded with respect to the adjacent light guides 28', 28", for example by opaque films.

All the lighting and/or signalling devices 4 described above, according to a possible embodiment, may comprise on the front wall 44, at the lighting faces 36,40, a diffuser e.g. opaline or embossed element 104.

The opaline or embossed diffuser element 104 may be applied in the form of films on the lighting faces 36,40.

It is also possible to apply the opaline or embossed diffusion element 104 directly to the lenticular body 20.

The opaline or embossed diffuser element 104 can thus be incorporated into the front wall 44 of the light guide 28 and/or into a lenticular body 20 associated to cover the light guide 28.

The technical effect of such opaline or embossed, diffuser element 104 is to further homogenize the light beams emitted by the lighting faces of the lighting and/or signalling device in order to obtain a homogeneity of lighting completely equivalent to that obtainable with an O-led type technology.

It is therefore possible to create, for example, modules comprising two light guides 28', 28" with at least two respective lighting faces 36,40 and arrange them side by side so as to form complex lighting structures that can form particular light signals, symbols, logos, captions and messages of any kind.

An appropriate activation sequence of the various lighting faces, thanks to the separate controls of the respective LED light sources, will make it possible to obtain specific graphic effects, written, but also animations of various types, according to the needs of the user.

As may be appreciated from the description, the present invention makes it possible to overcome the drawbacks mentioned of the prior art.

In particular, the automotive lighting and/or signalling device according to the present invention makes it possible to obtain any predefined luminous pattern provided with portions with any degree of luminance, capable of fulfilling all the photometric specifications of the headlight but also capable of emitting light signals, graphics of any type so as to become a communication tool of information as well as a light signalling and lighting device.

In addition, the lighting and/or signalling device according to the present invention allows any animation to be obtained by activation on command and according to a predetermined sequence of the lighting faces of the light guides.

In addition, the various lighting portions have a level of homogeneity entirely comparable to those obtainable with O-led technology, while having a significantly lower complexity and cost than the latter technology.

The advantages described above are obtained regardless of the number and arrangement of the segmentations of the light guides used. In addition, each sector or segment is illuminated homogeneously and uniformly without allowing the leakage of light beams or sectors or segments not expressly lit. In this way, the division into several parts of the light guide and in general of the vehicle light is always respected in all operating conditions of the light. Each sector or segment is switched on or off independently of adjacent sectors or segments without running any risk of unwanted light beam leakage.

Therefore, it is possible to send light signals that are always clear and perfectly understandable, i.e. it is possible to turn on segments to form specific light patterns with graphic effects and/or light messages that are always clear and distinct, precisely because the activation of the individual segments or portions is always accurate and there are no unwanted light leaks.

In addition, the lighting and/or signalling devices of the present invention have an extremely small footprint so that they are suitable to be applied both inside and outside the vehicle; furthermore, their reduced thickness facilitates their positioning in various positions since they do not require modification of the structure in which they are placed and do not require particularly deep housings.

The lighting and/or signalling devices of the present invention may be both planar and curved and therefore fit to be positioned at any point since they can easily be integrated into the curved lines of the bodywork and/or dashboard without any difficulty.

There are no limitations in terms of geometry or pattern or shape of the lighting faces obtainable.

The lighting patterns are also characterized by a remarkable uniformity and homogeneity of the light beam diffused outside the device.

Consequently, thanks to the present invention, it is possible to obtain a luminous pattern, i.e. any lighting surface, or having any geometric shape, while maintaining a high energy efficiency and homogeneity of lighting of the pattern.

The solution is simple to achieve, with limited costs, weights and dimensions.

A person skilled in the art may make numerous modifications and variations to the lighting and/or signalling devices described above so as to satisfy contingent and specific requirements while remaining within the sphere of protection of the invention as defined by the following claims.

For example, the LED light sources could backlight the light guide instead of being placed at a margin of the light guide.

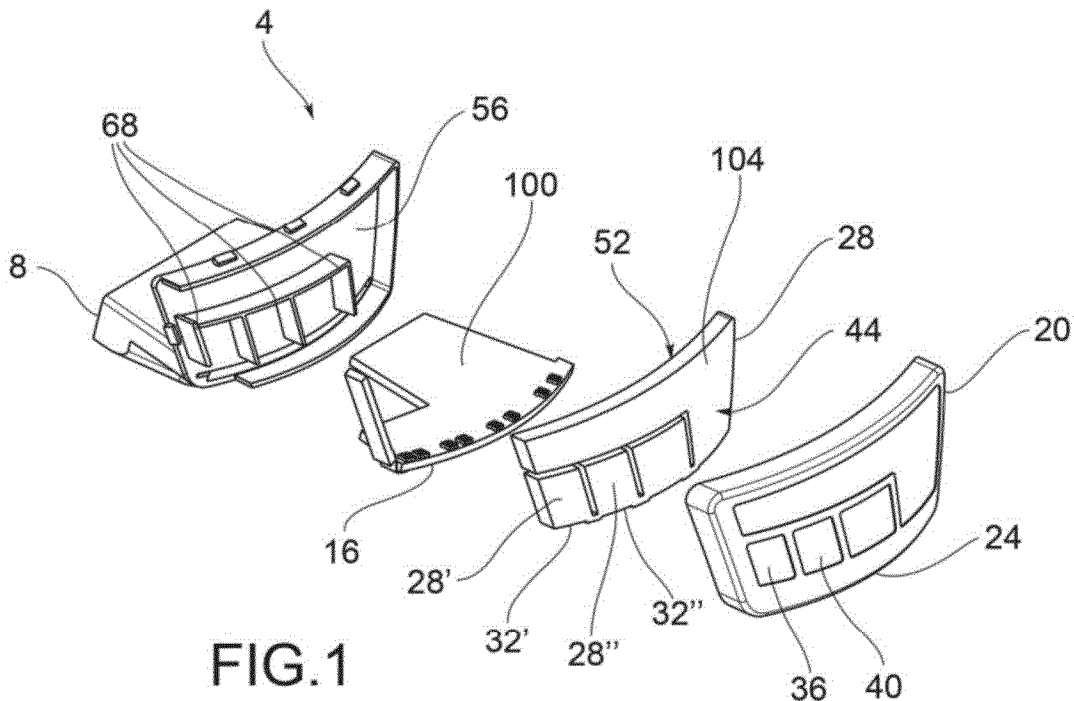
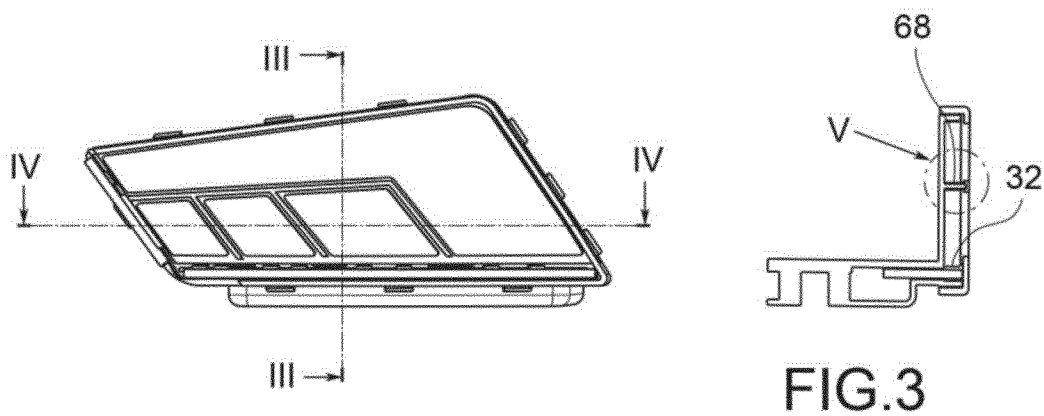
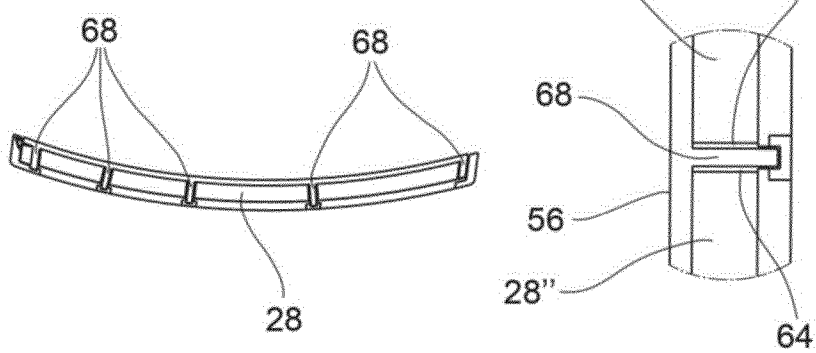

The invention claimed is:

1. A lighting device comprising:
   a light guide including at least two light guide portions arranged proximate one another, each of the light guide portions having a light input wall, a rear wall, and a front wall opposite the rear wall;
   at least two light emitting diodes (LED) configured to be powered and activated individually, each LED facing a respective light input wall of a corresponding light guide portion;
   diffuser extractor elements arranged on the rear wall of each light guide portion; and
   barrier wall elements provided between the light guide portions extending at least from the rear wall to at least said front wall, to mechanically and optically separate the light guide portions to prevent light from leaking from one light guide portion to the other, at least one of said barrier wall elements is provided with a through inner seat inside which a perimeter light guide is housed to which a perimeter light source is associated shaped to selectively illuminate said inner seat,
   wherein light emitted by each LED is received by the light input wall of the corresponding light guide portion, and is transmitted within the light guide until at least a portion of such transmitted light is redirected by the diffuser extractor elements to be outputted by the light guide.

2. The lighting device as set forth in claim 1, wherein said extractor diffuser elements are shaped so as to extract the light at least partially towards the front wall.

3. The lighting device as set forth in claim 1, wherein said barrier elements delimit the entire perimeter of the light guides so as to optically isolate and delimit the front wall corresponding to each light guide.

4. The lighting device as set forth in claim 1, wherein said barrier elements completely cross any portion transparent to light rays arranged beyond the rear wall of the light guide towards the front wall comprising the latter.

5. The lighting device as set forth in claim 1, wherein said front wall belongs to the light guide.

6. The lighting device as set forth in claim 1, further comprising a lenticular body provided in front of said light guide, wherein the barrier wall elements extend into said lenticular body.

7. The lighting device as set forth in claim 1, wherein a lenticular body is provided associated to cover the light guide, said lenticular body being arranged at a distance from the light guide such as not to be able to reflect back the light beams towards said light guide.

8. The lighting device as set forth in claim 1, wherein said inner seat is optically shielded with respect to the adjacent light guides.

9. The lighting device as set forth in claim 1, wherein the diffuser extractor elements are micro-optics/micro structures that diffuse light towards the front wall.

10. The lighting device as set forth in claim 1, wherein the diffuser extractor elements are arranged according to a non-homogeneous scheme having a density that increases as the distance from the corresponding LED light source increases along the extension of the light guide.

11. The lighting device as set forth in claim 1, wherein the barrier element comprises a film opaque to light.

12. The lighting device as set forth in claim 1, wherein the light guides and the respective LED light sources have a total internal reflection condition of the light beam passing through the light guides.

13. The lighting device as set forth in claim 1, wherein a light input wall of the light guides, directly facing the corresponding LED light sources, transmits the light inside the light guide in the total internal reflection condition.

14. The lighting device as set forth in claim 1, wherein a light input wall of the light guides comprises sinusoidal, cylindrical, or prismed section optics.

15. The lighting device as set forth in claim 1, wherein the light guides, the reflectors and the barrier elements are contained inside a container body equipped with an inner lateral surface equipped with reflector elements of the light.

16. The lighting device as set forth in claim 1, wherein the LED light sources are arranged along a perimeter formed by the unification of the light guides and are powered by an electronic board or several electronic boards which follow said perimeter.

17. The lighting device as set forth in claim 1, wherein at least two light guides are comprised, joined together by an appendage, on the side of the respective light input walls, said appendage being arranged in a position substantially rearward with respect to the LED light sources parallel to a prevailing propagation direction of the light beams emitted by the LED light sources.

18. The lighting device as set forth in claim 1, wherein on the side of the front wall, at the lighting faces an opaline and/or embossed diffuser element is arranged.

19. The lighting device as set forth in claim 18, wherein said diffuser element is incorporated into the front wall of the light guide and/or into a lenticular body associated to cover the light guide.

20. The lighting device as set forth in claim 1, wherein said extractor diffuser elements are shaped so as to extract the light at least partially towards the rear wall.

21. The lighting device as set forth in claim 20, further comprising at least one reflector element facing the diffuser extractor elements of a respective light guide portion, and configured to reflect outputting the back wall towards the front wall, wherein said barrier wall elements extend from the reflector element to at least said front wall.

22. The lighting device as set forth in claim 21, wherein said barrier elements completely cross any portion transparent to light rays arranged beyond the reflector element toward the front wall, comprising the latter.

23. The lighting device as set forth in claim 21, wherein the barrier elements are associated with the reflector element, cross the light guide and extend as far as the front wall.

24. The lighting device as set forth in claim 21, wherein said barrier elements are co-moulded or embedded in the light guide and extend at least partially inside the reflector element and at least partially inside the front wall.

25. The lighting device as set forth in claim 21, wherein said barrier elements are co-moulded with the front wall and extend as far as the reflector element.

26. The lighting device as set forth in claim 21, wherein the reflector element is a white film or a mirror reflecting the light coming from the rear wall of the light guides.

\* \* \* \* \*

UNITED STATES PATENT AND TRADEMARK OFFICE
CERTIFICATE OF CORRECTION

| | |
|---|---|
| PATENT NO. | : 11,255,503 B2 |
| APPLICATION NO. | : 16/705990 |
| DATED | : February 22, 2022 |
| INVENTOR(S) | : Antonipieri et al. |

It is certified that error appears in the above-identified patent and that said Letters Patent is hereby corrected as shown below:

In the Drawings

Sheet 1 of 8: please replace Fig. 1 with Figs. 1, 2, 3, 4 and 5 as shown on the attached page.

Signed and Sealed this
Eleventh Day of October, 2022

Katherine Kelly Vidal
*Director of the United States Patent and Trademark Office*